United States Patent [19]

Tanaka

[11] Patent Number: 5,050,926

[45] Date of Patent: Sep. 24, 1991

[54] PARTITION PLATE FOR AUTOMOTIVE VEHICLE

[75] Inventor: Yasuo Tanaka, Ayase, Japan

[73] Assignee: Ikeda Bussan Co., Ltd., Ayase, Japan

[21] Appl. No.: 641,297

[22] Filed: Jan. 15, 1991

[30] Foreign Application Priority Data

Mar. 29, 1990 [JP] Japan .............................. 2-31837[U]

[51] Int. Cl.[5] .......................... B60J 5/00; B62D 43/10

[52] U.S. Cl. .................................... 296/146; 296/373; 292/83; 292/91; 292/244; 292/303

[58] Field of Search ................. 296/146, 37.3; 292/80, 292/83, 91, 49, 244, 303

[56] References Cited

U.S. PATENT DOCUMENTS 1,513,710 10/1924 Lewis ................................ 292/91 X 2,507,511 5/1950 Freidag et al. .................... 292/91 X 3,904,230 9/1975 Fane et al. ............................ 292/49

FOREIGN PATENT DOCUMENTS 149833 5/1937 Austria ................................. 292/91

*Primary Examiner*—Margaret A. Focarino
*Assistant Examiner*—Gary C. Hoge
*Attorney, Agent, or Firm*—Foley & Lardner

[57] ABSTRACT

A partition plate in use for a vehicle comprises a locking device with which the partition plate is connected to a luggage floor of the luggage compartment even if the partition plate is fitted on the luggage floor with either its right surface or reverse surface. The locking device includes a lock spring having a nipping portion with which a projecting pin is nipped so that the partition plate is fixed to the luggage floor. The nipping portion is enlarged to disengage from the projecting pin when an elongate pushing member is rotated upon rotation of an operating lever.

8 Claims, 5 Drawing Sheets

PARTITION PLATE FOR AUTOMOTIVE VEHICLE

BACKGROUND OF THE INVENTION

1. Field of the Invention

The present invention relates to improvements in a partition plate which is used to divide a luggage compartment of an automotive vehicle into a main compartment and a sub-compartment storing a spare tire and/or the like, and more particularly to a partition plate in which a locking device is provided to secure the partition plate to the luggage compartment even if either surface of the partition plate is faced to the luggage compartment.

2. Description of the Prior Art

It is well known that a partition plate for dividing a luggage compartment is used for an automotive vehicle. Since such a partition plate has a relatively large flat surface and is detachable so as to be removable out of the luggage compartment, it has been proposed that the partition plate be used as a table in the outdoors upon being removed out of the luggage compartment as the partition plate is the type of being reversibly usable.

An example of such a conventional partition plate 6 is shown in FIG. 9 of the present application, in which the partition plate 6 is detachably installed on a luggage floor 5 of a luggage compartment (no numeral). The partition plate 6 includes a locking device 10 with which the partition plate 6 is fixedly secured to a connecting member 9 formed at an end section 5*a* of the luggage floor 5. As shown in FIG. 9, the locking device 10 includes a housing 11 installed to a recess of the partition plate 6, a control lever 12 formed at a depression of the housing 11, a locking member 13 connected to the control lever 12 and a spring 14 by which the locking member 13 is pushed so that the partion plate 6 is put into its locking condition. When the control lever 12 is rotated in the direction of an arrow A indicated in FIG. 9, the locking member 13 is downwardly inclined and released from the connecting member 9. Therefore, the partition plate 6 is put into its unlocking condition.

However, with this conventional arrangement, the locking device 10 is formed so that only one side of the partition plate 6 can be fixedly fitted to the luggage floor 5. Furthermore, when the partition plate 6 is installed on the luggage compartment, a clearance is formed between the locking device 10 and the luggage floor end section 5*a*, thereby degrading an external appearance of the luggage compartment.

SUMMARY OF THE INVENTION

It is an object of the present invention to provide an improved partition plate which is lockably installed to a luggage floor even if either surface of the partition plate is faced to a space to be covered with the partition plate.

A partition plate of the present invention is in use for a vehicle and detachable from a member defining a compartment which member is provided with a projecting pin. The partition plate comprises a board section and a locking device installed to the board section. The locking device includes a housing member having a through-hole through which the projection pin passes from one surface to the other surface of the housing member when the partition plate is secured to the compartment defining member. A lock spring is disposed in the housing member and lockably engageable with the projecting pin. The lock spring takes one of a first state in which the lock spring lockably engages with the projecting pin and a second state in which a lockable engagement of said lock spring and the projecting pin is released. A pushing member is engageable with the lock spring and rotatable to put the lock spring into one of the first and second states. A pair of control levers are fixedly connected to the pushing member to rotate the pushing member against a bias of the lock spring. The pair of control levers is located opposite each other with respect to a center plane of the board section.

With this arrangement, the partition plate is fittable to the luggage floor with either surface of the partition plate. Furthermore, the partition plate can be disposed without an excessive clearance between the locking device and the luggage floor. Therefore, the partition plate is largely improved in use and quality.

DETAILED DESCRIPTION OF THE INVENTION

Figure 1:
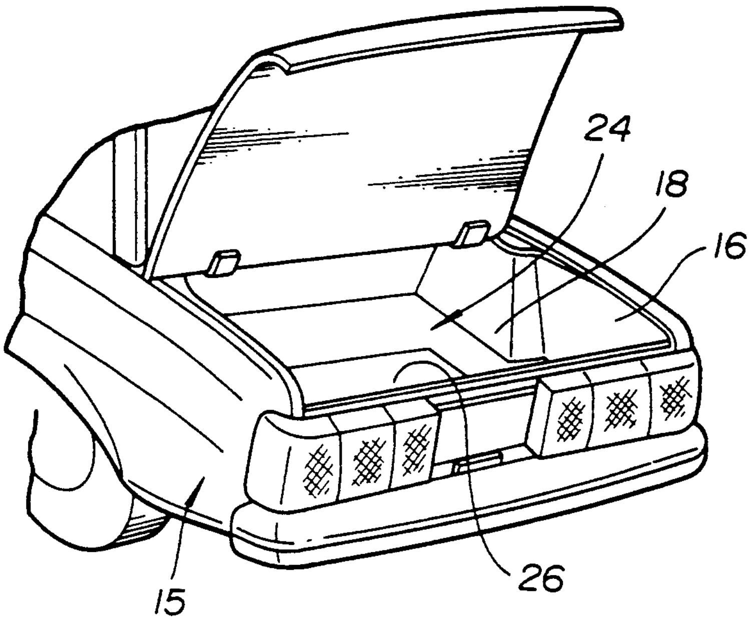
FIG. 1 is a perspective view of an embodiment of a partition plate according to the present invention and a luggage floor.

Referring now to FIGS. 1 to 6, an embodiment of the partition plate according to the present invention is illustrated by the reference numeral 20. The partition plate 20 is used for covering a sub-space 26 formed in a luggage compartment 16 of an automotive vehicle 15. The sub-space 26 is located under a main space 18 of the luggage compartment 16 and arranged to store a spare tire and/or the like therein though not shown. The partition plate 20 of a generally rectangular shape comprises a board 21 which has such a size as to be fitted within a step section 26*a* of the sub-space 26. The board 21 is formed of a molded plastic and has a hollow 21*d* therein.

The board 21 includes a right surface 21*a*, a reverse surface 21*c* and a side peripheral surface 21*b*. The right and reverse surfaces 21*a*, 21*c* are parallel with each other, forming the hollow 21*d* therebetween. The side peripheral surface 21*b* is integral with the edges of the right and reverse surfaces 21*a*, 21*c* so as to sealingly surround the hollow 21*d*. The right surface 21*a* is covered with a carpet 22 serving as a trim member.

The board 21 is formed with a recess 22*a* at a middle part of its front side end. A locking device 23 is provided in the recess 22*a* to be generally flush with the surfaces 21*a*, 21*c* of the board 11. A pair of connecting members 25 outwardly project from the side peripheral surface 21*b* of an opposite side to the recess 22*a* of the board 21.

The partition plate 20 is fitted on the step section 26*a* of the sub-space 26 in a manner such that the connecting members 25 are inserted into holes 24*b* of a luggage floor 24 formed at a second 24*a* the luggage floor 24 so that the locking device 23 is fixedly connected with a projecting pin 28 formed on the step section 26*a*. The projecting pin 28 has a slender or neck portion 28*a* and is disposed at the front middle side end of the section 24*a*. The projecting pin 28 can be inserted into a through-hole 29*a* of the locking device 23 even if either surface of the partition plate 20 is faced to the sub-space 26.

The locking device 23 includes a pair of housing members 29. Each housing member 29 is formed of a molded plastic and are disposed at the recess 21 of the board 21. Each of the housing members 29 is secured so as to nip the installation projection 21*a* of the board 11 and a pair of supporting plates 32. The housing member 29 has the through-hole 29*a* through which a projecting pin 28 passes to be secured to the locking device 23 even if either surface of the partition plate 10 is faced to the sub-space 26. The housing member 29 has a circular depression 29*b* formed at an outer side of the housing member 29. Each of a pair of control or operating levers 33 includes a base member 33*a* formed in a round shape. A protruding part 33*b* is integral with the base member 33*b* and perpendicularly extends. Each of the control levers 33 is disposed in the depression 29*b* and fixedly connected to each other through a shaft 34 passing through the housing member 29. The control levers 33 are located opposite to each other with respect to a center plane C which imaginarily divides the board 21 into two equal parts. A stopper (not shown) or the like is provided so that the control lever 33 is rotated within the range of 90 degrees relative to a center line X which passes through the axis of the shaft 34 and imaginarily divides the supporting plate 21 into equal two parts. A spirally wound spring 35 is disposed around and connected at its one end with the shaft 34 so that the lock spring 30 is returned into its locking condition when the control lever 33 is released. Another end of the spring 35 is fixed to the supporting plate 32.

Figure 6:
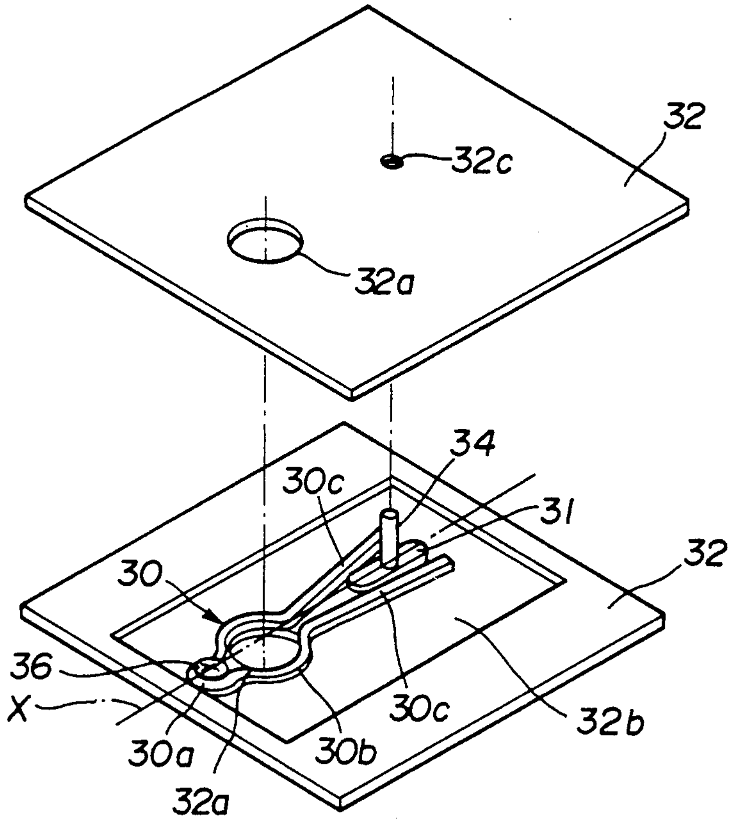
FIG. 6 is an exploded perspective view of an essential part of a locking device of the partition plate.

The lock spring 30 is disposed between the supporting plates 32 each of which has a rectangular groove 32*b* as shown in FIG. 6. The lock spring 30 made of a spring wire is formed generally V-shaped and has a pair of nipping portions 30*b* with which the projecting pin 28 is resiliently engaged at its slender portion 28*a* with the nipping portions 30*a*. A center portion 30*a* of the lock spring 30 is secured to the supporting plate 32 with a small screw 36 so that the lock spring 30 is located along the line X and disposed in the groove 32*b*. Each nipping portion 30*b* is integral with the center portion 30*a* and each leg portion 30*c*.

The supporting plate 32 has a through-hole 32*a* which is formed coaxial with the through-hole 29*a* when the supporting plate 32 is installed in the partition plate 20. The supporting plates 32 are disposed so that the grooves 32*b* face to each other. The supporting plate 32 has a small through-hole 32*c* through which the shaft 34 passes. The lock spring 30 is disposed in the grooves 32*b* so that the nipping portions 30*b* are formed along a periphery defining the hole 32*a*. A pushing member 31 is formed elongate and fixedly connected to the shaft 34 and disposed between the leg portions 30*c* so as to be symmetrical relative to the line X. The pushing member 31 is rotated through the shaft 34 in accordance with the rotation of the control lever 33, thereby enlarging the distance between the end portions 30*c*. Therefore, the lock spring 30 is deformed to be put into its unlocking condition.

Figure 7:
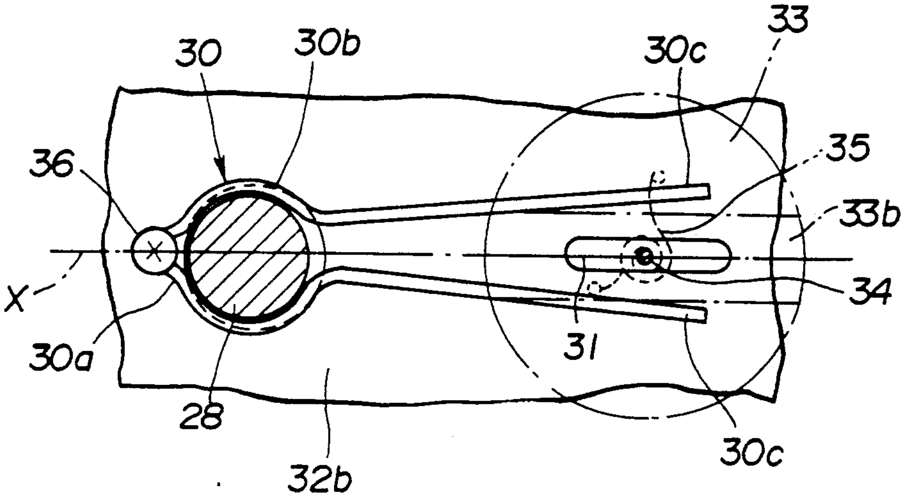
FIG. 7 is a fragmentary plan view of the locking device under the locking condition.

The manner of operation of the thus arranged locking device 23 of the partition plate 20 will be discussed hereinafter also referring to FIGS. 7 and 8.

Figure 2:
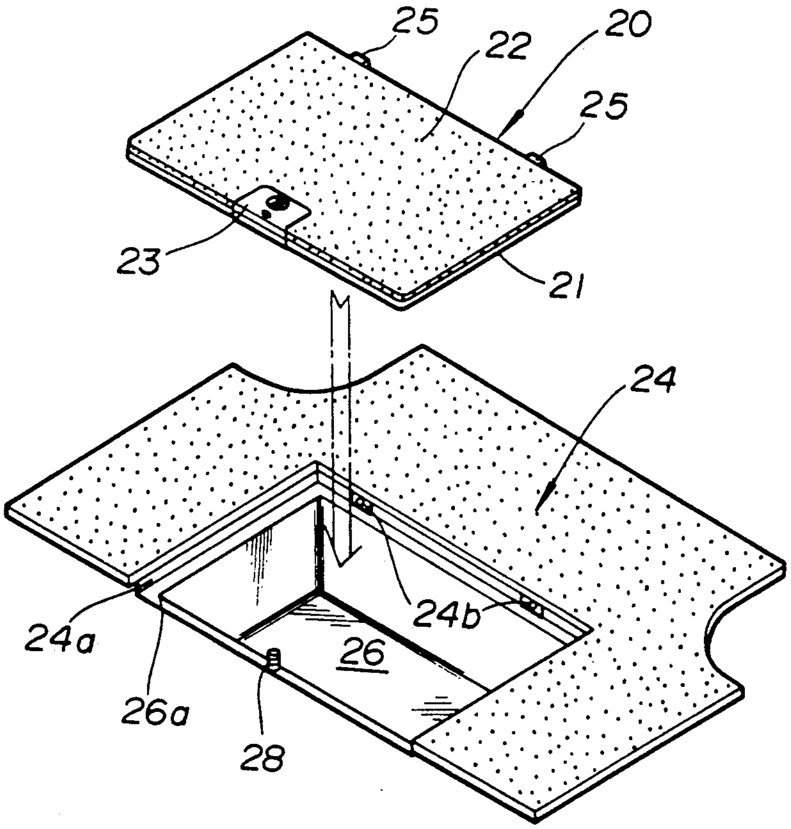
FIG. 2 is a backward perspective view of an automotive vehicle having a partition plate according to the present invention.
Figure 3:
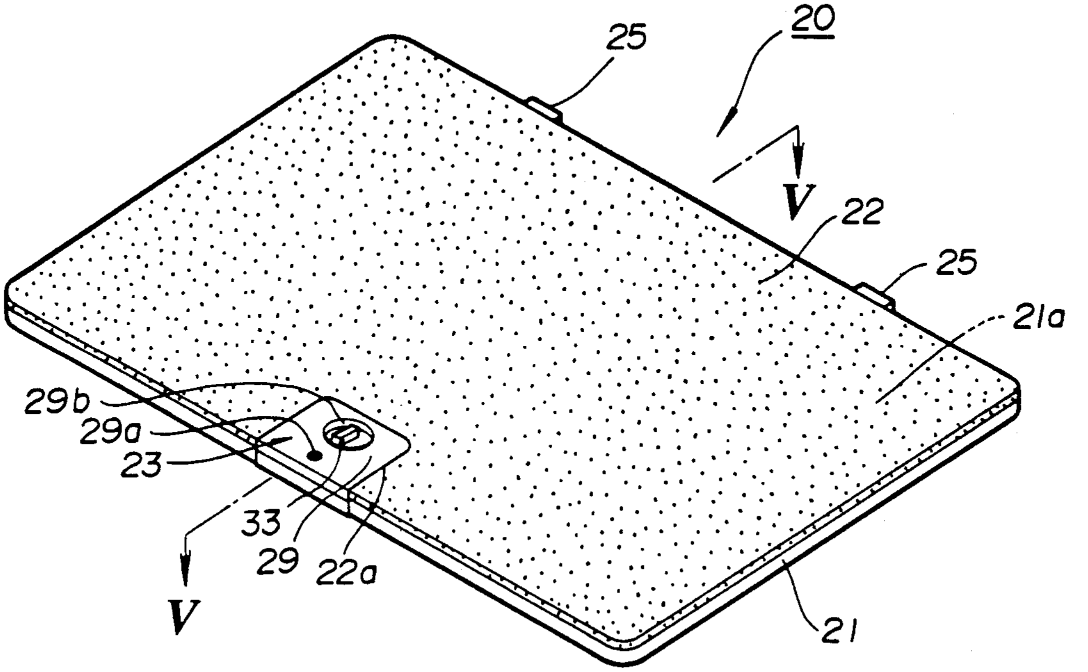
FIG. 3 is a perspective view of the partition plate of FIG. 2.
Figure 4:
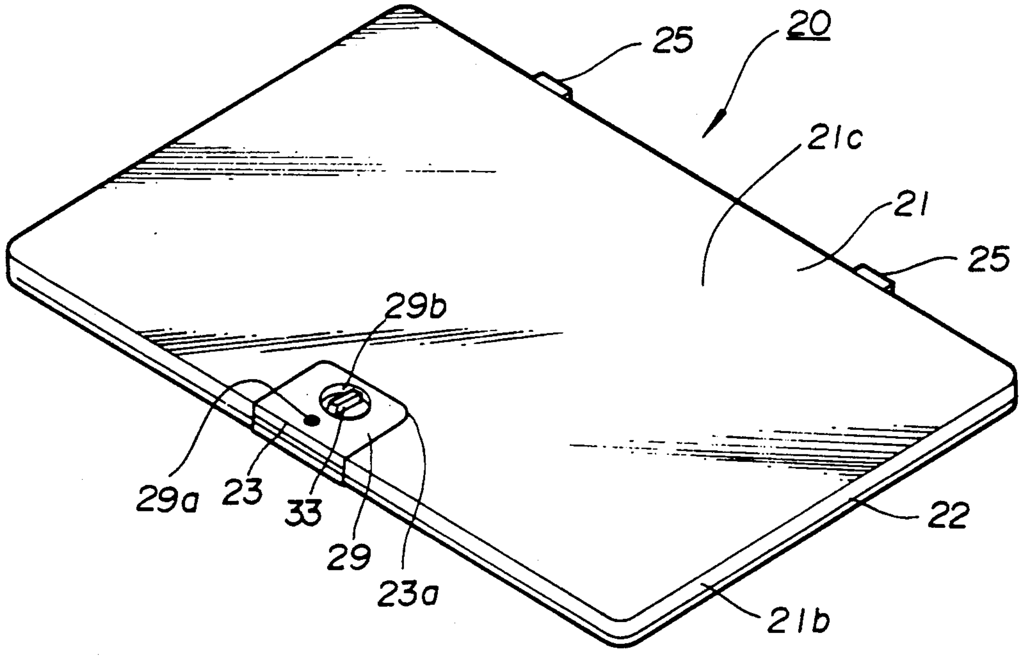
FIG. 4 is another perspective view of the partition plate as viewed from the opposite direction of FIG. 3.
Figure 5:
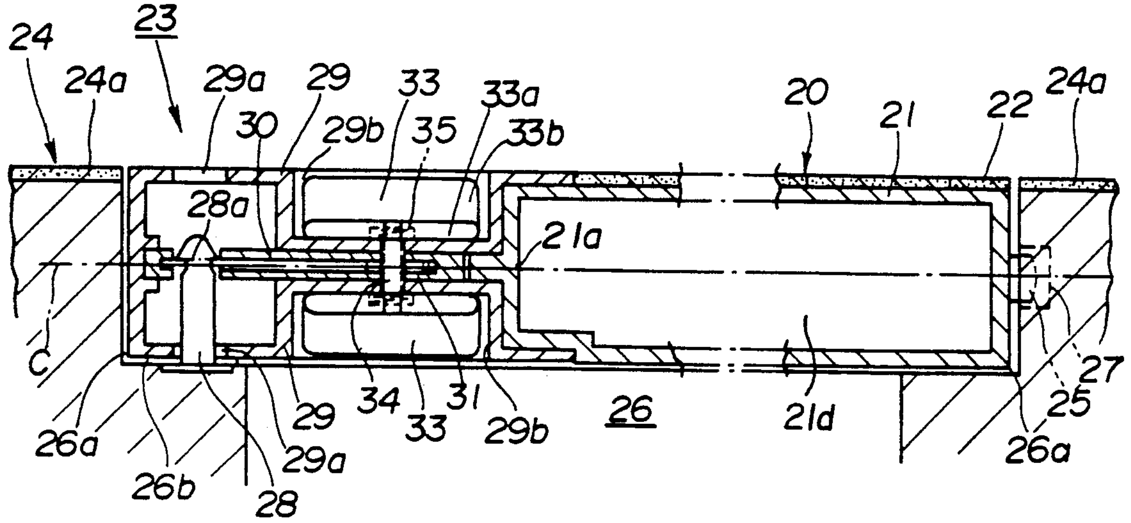
FIG. 5 is a cross-sectional view taken in the direction of arrows substantially along a line V—V of FIG. 3.

As shown in FIGS. 1 and 2, the partition plate 20 is fitted to the luggage floor 24 in a manner that the connecting members 25 are inserted into the holes 24*b* and that the partition plate 20 is put on the step section 26*a*. When the partition plate 20 is locked to the luggage floor 24, the lock spring 30 is engaged with the projecting pin 28 as shown in FIG. 7. Thus, the locking condition of the partition plate 20 is established. More specifically, when the nipping portion 30*b* of the lock spring 30 passes through a top portion of the projecting pin 28, the nipping portion 30*b* of the lock spring 30 is enlarged in diameter. Then, the lock spring 30 is returned to the locking condition so that the nipping portion 30*b* nips the slender portion 28*a*. Accordingly, the partition plate 20 is fixedly fitted to the step section 26*a* in a manner to be put on the step section 26*a* even if either surface of the partition plate 20 is faced to the sub-space 26.

Figure 8:
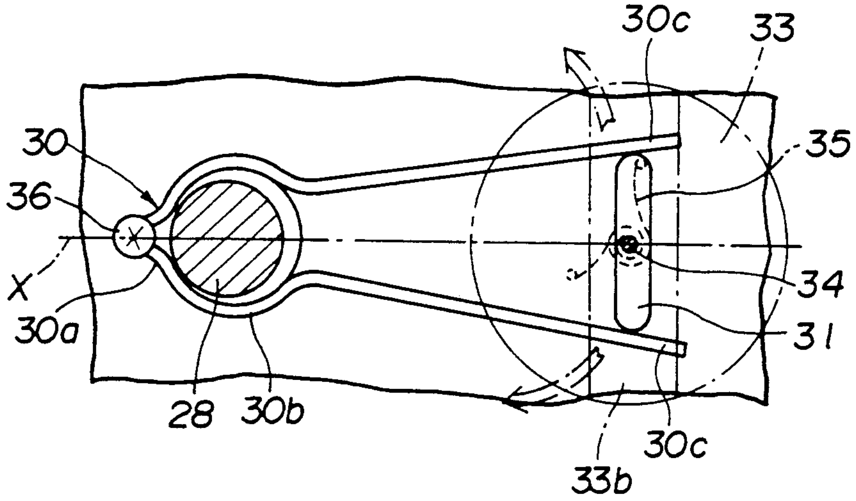
FIG. 8 is a fragmentary plan view of the locking device under the unlocking condition.
Figure 9:
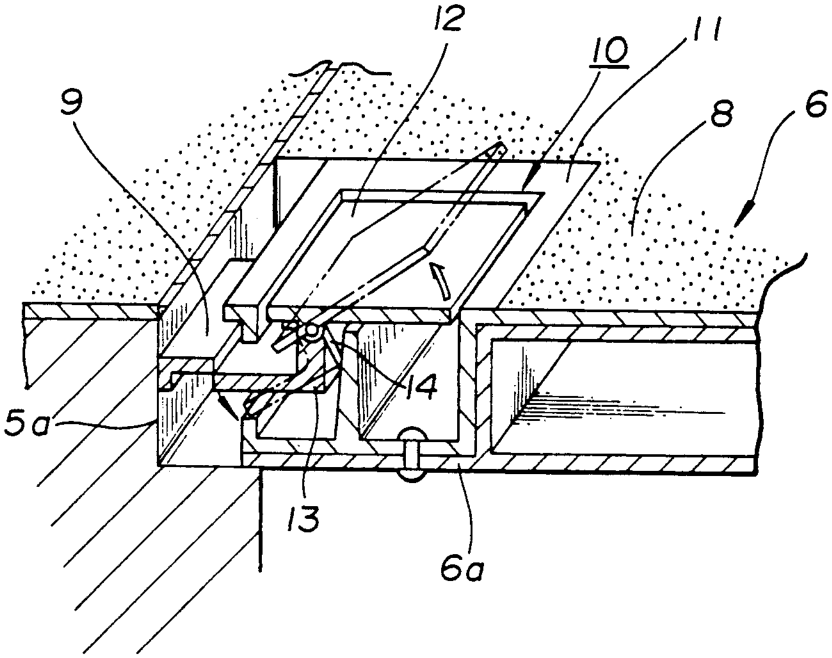
FIG. 9 (PRIOR ART)
FIG. 9 is a fragmentary perspective view of a conventional partition plate installed to a luggage floor.

In order to take the partition plate 20 out from the luggage compartment 16, the control lever 33 is rotated against a biasing force of the spring 35 by a hand of a passenger so that the nipping portion 30*b* of the lock spring 30 is released from the projecting pin 28 as shown in FIG. 8. More specifically, when the control lever 33 is rotated against a biasing force of the spring 35, the pushing member 31 is rotated and enlarges the distance between the end portions 30*c*. The lock spring 30 is deformed at its nipping portion 30*b* in the diameter enlarged direction so that the projecting pin 28 is released from the projecting pin 28. When the partition plate 20 is lifted, a clearance is formed between the partition plate 20 and the step section 26*a*. Then, the partition plate 20 is detached from the luggage compartment by being pulled out.

Under the condition of FIG. 8, the lock spring 30 has such a biasing force that its leg portions 30*c* return to their original position. Accordingly, when the control lever 33 is released from the passenger's hand, the lock spring 30 is deformed from the unlocking condition to the locking condition while the control lever 33 is returned into a state as shown in FIG. 7 by the biasing force of the spring 35.

With the thus arranged locking device 23 of the partition plate 20, The partition plate 20 is securely fitted to the step section 26*a* even if either surface of the partition plate 20 is faced to the step section 26*a*. Furthermore, since the locking device 23 is designed to reduce the number of component parts as few as possible, the partition plate 20 can be produced inexpensively.

While only one embodiment has been shown and described, it will be understood that the present invention is not limited to this embodiment and that various modifications and improvements can be applied to the invention. It will be appreciated that thus arranged partition plate may be used as a tonneau board with which a passenger room and a luggage compartment are divided, and as a cover board closing an opening of a member defining an engine compartment.

What is claimed is:

1. A partition plate in use for a vehicle, said partition plate being detachable from a member defining a compartment which member is provided with a projecting pin, said partition plate comprising:

a board section; and a locking device installed to said board section, said locking device including:

a housing member having a through-hole through which the projection pin passes from one surface to another surface of said housing member when the partition plate is secured to the compartment defining member;

a lock spring disposed in said housing member and lockably engageable with the projecting pin, said lock spring taking one of a first state in which said lock spring lockably engages with the projecting pin and a second state in which a lockable engagement of said lock spring and the projecting pin is released;

a pushing member which is engageable with said lock spring and rotatable to put said lock spring into one of said first and second states; and a pair of operating levers fixedly connected to said pushing member to rotate said pushing member against a bias of said lock spring, said pair of operating levers being located opposite to each other with respect to a center plane of said board section.

2. A partition plate as claimed in claim 1, further comprising a supporting plate disposed in said housing member to support said lock spring, said housing member having a groove in which said lock spring is disposed.

3. A partition plate as claimed in claim 2, wherein said operating liners are connected to said pushing member through a connecting shaft which passes through a small through-hole formed in said supporting plate.

4. A partition plate as claimed in claim 2, wherein said lock spring is operatively associated with a connecting shaft via said pushing member, said connecting shaft passing through a small through-hole formed in said supporting plate.

5. A partition plate as claimed in claim 1, wherein said operating levers are pivotally connected to said housing member with a shaft.

6. A partition plate as claimed in claim 1, wherein said lock spring is formed of a spring wire and includes a pair of nipping portions springingly engageable with the projecting pin, a pair of leg portions integral with said nipping portions, and a connecting portion connected to said supporting plate with a small screw and integral with said nipping portions.

7. A partition plate as claimed in claim 1, wherein said board section has first and second surfaces which are opposite to each other, and a side peripheral surface through which said first and second surfaces are connected, said board having a recess at a middle part of its front side end.

8. A partition arrangement in a vehicle, said partition arrangement including a board section being detachable from a member defining compartment, said partition arrangement comprising:

a projecting pin fixed to the compartment defining member, said projecting pin having a slender portion which is slender as compared with a top end portion thereof;

said board section being detachable from the compartment defining member, said board section having first and second surfaces which are opposite to each other with respect to a center plane;

means for allowing either one of the first and second surfaces of said board section to contact with the compartment defining member; and a locking device installed to said board section and having first and second surfaces which are generally flush with the first and second surfaces of said partition plate, said locking device including;

a housing member having a through-hole through which the projecting pin is passable in one of a first direction of the first surface to the second surface of said locking device and a second direction of the second surface to the first surface of said locking device;

a lock spring disposed in said housing member and lockably engageable with the slender portion of the projecting pin, said lock spring taking one of a first state in which said lock spring lockably engages with the projecting pin and a second state in which a lockable engagement of said lock spring and the projecting pin is released;

a pushing member which is engageable with said lock spring and rotatable to put said lock spring into one of said first and second states; and a pair of operating levers connected to said pushing member to rotate said pushing member against a bias of said lock spring, said pair of operating levers being located opposite to each other with respect to the center plane.

* * * * *